Sept. 18, 1928.
E. W. DAVIS
1,684,946
LUBRICANT COMPRESSOR
Filed May 3, 1924
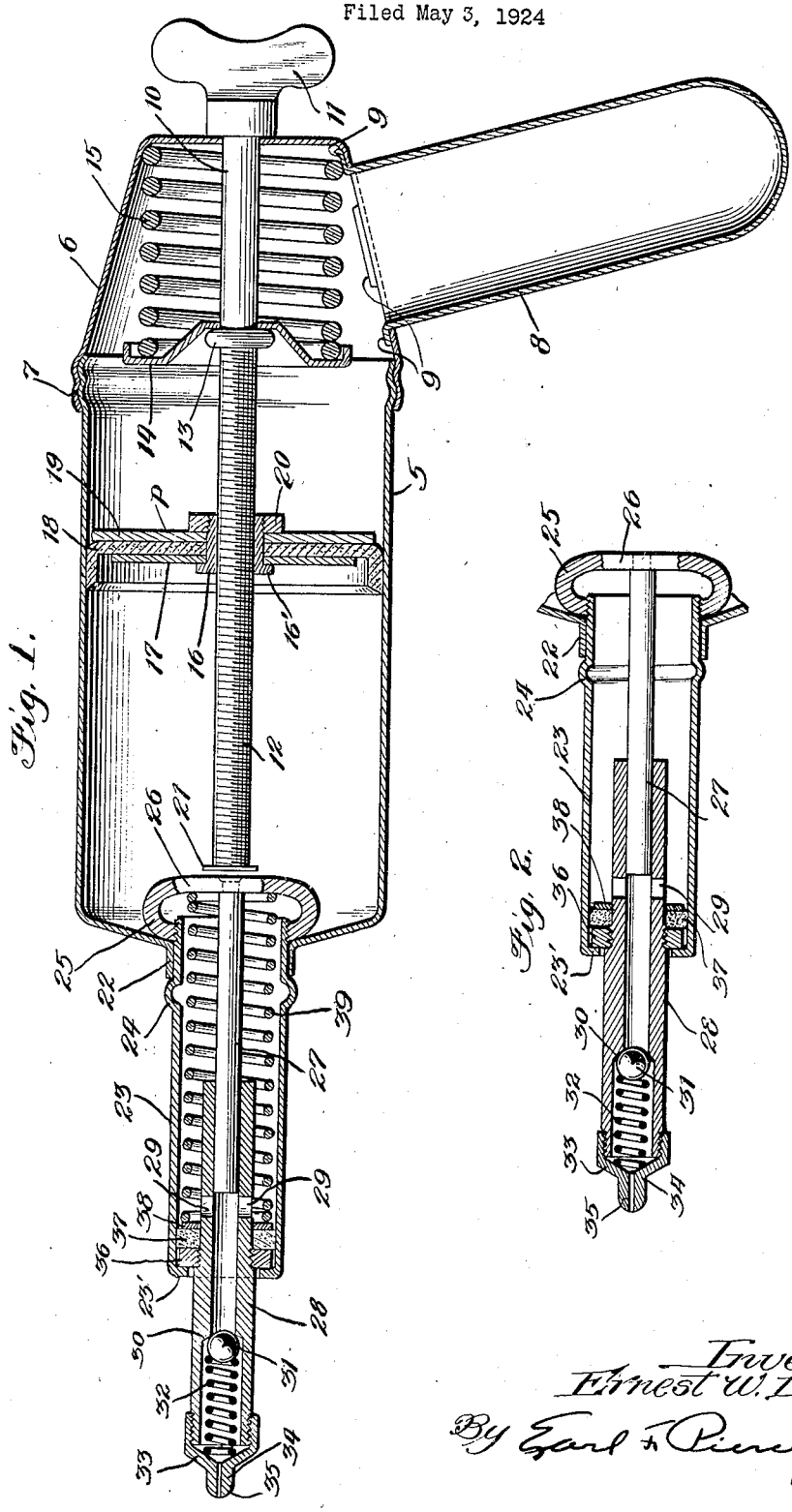

Patented Sept. 18, 1928.

1,684,946

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed May 3, 1924. Serial No. 710,775.

My invention relates to improvements in lubricant compressors, and is particularly concerned with the provision of a novel type of compressor for supplying lubricant under high pressure to bearings to be lubricated.

The objects of my present invention are:

First, to provide a compressor, of the character described, which is particularly adapted, though not limited, to be used as a part of a system comprising a plurality of fittings, one of which is secured to each of the bearings to be lubricated, and a compressor for supplying lubricant thereto, the compressor embodying means for making sealed connection with the lubricant receiving fittings.

Second, to provide a lubricant compressor, comprising a barrel, or low pressure cylinder, for holding a supply of lubricant and a high pressure cylinder communicating therewith, in combination with means for displacing the lubricant from the high pressure cylinder into the fittings.

Third, to provide a lubricant compressor, of the character described, in which means are provided for insuring successive charges of lubricant being forced from the barrel into the high pressure cylinder.

Fourth, to provide a compressor, such as described, in which a single spring effects the discharge of lubricant from the barrel into the cylinder, and also moves the high pressure cylinder to its charging position.

Fifth, to provide a compressor, such as described, in which the high pressure cylinder, under the action of the spring mentioned in the preceding object, acts as an indicating means for indicating to the operator that the means for charging the high pressure cylinder are in operative condition.

Sixth, to provide a compressor, such as described, certain parts of which can be made by metal drawing processes; and Seventh, to provide a compressor, of the character described, which is simple in construction, economical to manufacture and easy to operate.

Other objects of my invention will appear as this description progresses, reference being had to the accompanying drawings, in which Figure 1 is a central, longitudinal section through one embodiment of my invention; and Figure 2 is a sectional detail of a modified form of my invention.

Referring, for the present, to Figure 1, my improved compressor comprises the barrel, or low pressure cylinder 5, which is provided at its open end with the removable closure 6, secured thereto by a threaded connection 7, or in any other desired manner. The cap 6 is provided with a hollow tubular handle 8, having tongues 9 formed at its inner end and preferably spot welded to the side of the cap 6.

A piston rod 10 is reciprocably mounted in a suitable opening in the end of the cap 6 and is provided at its outer end with a suitable handle 11, by which the same can be rotated. The inner end of the piston rod 10 is screwthreaded, as shown at 12, this thread, preferably, though not necessarily, being a left-hand thread. A collar or stop member 13 is secured to the piston rod 10, where the threaded and unthreaded portions of this rod meet, and a disk 14 is mounted upon the unthreaded portion of the rod and abuts against the collar 13. A compression spring 15 is confined between the collar 13 and the end of the cap 6 and tends to hold the piston rod 12 in its innermost position.

I provide a piston P for contacting with the lubricant in the barrel 5 and constantly maintaining a pressure thereupon, tending to force it into the high pressure cylinder about to be described. This piston comprises the nut or sleeve 16, which is threaded upon the piston rod 12, the face plate 17, the cup leather 18 and the follower plate 19, all of which are centrally apertured to receive the sleeve or nut 16. A second nut 20, threaded upon the outer end of the sleeve 16, clamps the face plate 17, cup leather 18 and follower plate 19 between itself and the flange 16' on the sleeve 16, thereby holding these parts in assembled relation. The piston rod 12 terminates in a head 21 for engaging the inner end of the sleeve 16 to expedite the removal of the piston from the barrel 5.

The opposite end of the barrel terminates in a tubular extension 22. A sleeve 23 extends through the tubular extension 22 and is provided, adjacent its inner end, with an annular rib 24 for engaging the outer end of the tubular member 22. A nut 25 is threaded upon the inner end of the sleeve 23 and engages the adjacent end of the barrel 5 in such manner as to tightly clamp the sleeve 23 to the end of the barrel. The nut 25 comprises a bar 26, which extends across the inner end of the sleeve 23 and forms a support for the plunger 27.

A high pressure cylinder 28 is reciprocably mounted in the outer end of the sleeve 23 and its inner end surrounds the outer end of the plunger 27. Ports 29, formed intermediate the ends of the cylinder 28, provide means for establishing communication between the barrel 5 and the cylinder 28, it, of course, being understood that the lubricant passes from the barrel 5, around the bar 26 of the nut 25, into the sleeve 23 and from thence through the ports 29 into the high pressure cylinder. The outer end of the bore of the cylinder 28 is enlarged to provide a valve seat 30 for the ball valve 31, which is yieldingly held upon its seat by the compression spring 32. The outer end of this spring abuts against the cap 33, threaded upon the outer end of the cylinder 28. This cap terminates in a nipple 34, having the spherical end surface 35 that is adapted to be brought into sealed contact with a lubricant receiving fitting, so that lubricant under pressure can be transferred from the compressor to the fitting.

A collar 36, threaded onto the cylinder 28, intermediate the ends of the latter, provides a stop for engaging the inturned flange 23', of the sleeve 23, to limit the outward movement of the cylinder 28 relative to the plunger 27. A gasket or piston 37, preferably formed of heavy leather, or other similar, suitable material, surrounds the cylinder 28 and bears against the collar 36. A washer 38 also surrounds the cylinder 28 and contacts with the gasket or piston 37. For yieldingly urging the cylinder 28 outwardly, I provide the compression spring 39, which is confined between the washer 38 and the nut 25.

In operating my improved compressor just described, the operator first removes the cap 6 and with it the piston rod 12 and the piston P, and thereupon substantially fills the barrel 5 and the cylinder 23 with lubricant. The piston P is rotated until it is substantially in contact with the disk 14, and then it and the cap 6 are replaced upon the barrel. The operator then turns the wing nut or handle 11 in a direction to cause the piston P to tend to move inwardly. As soon as this piston firmly engages the lubricant in the barrel 5, its inward movement will be arrested and continued rotation of the handle 11 will cause the piston rod to move outwardly, thereby placing the spring 15 under compression. The operator then places the end of the nipple 34 in contact with a lubricant receiving fitting and by exerting a pressure upon the handle 8, substantially in the direction of the fitting, causes the cylinder 28 to move inwardly into the sleeve 23. The initial movement of the cylinder 28 causes the plunger 27 to close the ports 29 and further movement of these two elements, relatively to each other, causes the contents of the cylinder 28 to be placed under pressure and forced therefrom, past the valve 31 and into the fitting. The operator thereupon relieves the pressure upon the handle 8 and the spring 39 pushes the cylinder 23 and its associated parts away from the fitting, thereby opening the ports 29 and permitting lubricant to be forced into the high pressure cylinder under the action of the piston P and the tension of the spring 15. In this manner, he can continue to discharge lubricant from the compressor until the spring 15 has expanded to substantially the position shown in Figure 1, whereupon he again rotates the wing nut or handle 11 to bring the spring 15 under tension.

It will, of course, be understood that in the construction just described the pressure exerted upon the lubricant by the piston P and the spring 15 is exerted upon the piston or gasket 37, in addition to the tension of the spring 39. If the spring 15 is made sufficiently heavy, the spring 39 can be entirely omitted, this being the construction illustrated in Figure 2. When the construction of my improved compressor is thus modified, the cylinder 28 will act as an indicator to indicate to the operator when the spring 15 requires retensioning, for if this spring is no longer able to place pressure upon the lubricant in the barrel 5, the cylinder 28 will not return to the position shown in Figure 1 after it has been forced into the sleeve 23. As soon, however, as the operator turns the handle 11 and places the spring 15 under compression, the pressure exerted upon the lubricant will act against the piston 37 and force the cylinder 28 outwardly.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricant compressor, comprising a barrel having an elongated removable cap at one end and a tubular extension at its other end, a piston rod reciprocably mounted in said cap, a spring for urging said piston rod inwardly, a piston threaded onto said piston rod, a sleeve extending through said tubular extension, said sleeve having an annular rib adjacent its inner end for engaging the outer end of said tubular extension, a nut threaded onto the inner end of said sleeve and engaging the end of said barrel, said nut comprising a bar extending across the inner end of said sleeve, a cylinder reciprocably mounted at the outer end of said sleeve, a piston carried by said cylinder, and a spring confined between said bar and said piston.

2. A lubricant compressor, comprising a barrel having a removable cap at one end and a tubular extension at its other end, a piston rod reciprocably mounted in said cap, a spring for urging said piston rod inwardly, a piston threaded onto said piston rod, a sleeve extending through said tubular extension, a nut threaded onto the inner end of said sleeve and engaging the end of said barrel, said nut comprising a bar extending across the inner end of said sleeve, a cylinder reciprocably mounted at the outer end of said sleeve, a piston carried by said cylinder, and a spring confined between said bar and said piston.

3. A lubricant compressor, comprising a barrel having a removable cap at one end, a piston rod reciprocably mounted in said cap, a spring for urging said piston rod inwardly, a piston threaded onto said piston rod, a sleeve communicating with said barrel, a cylinder reciprocably mounted at the outer end of said sleeve, a piston carried by said cylinder, and a spring confined between said piston and an abutment rigid with said barrel.

4. A lubricant compressor, comprising a barrel having a closure at one end, a piston rod reciprocably mounted in said closure, a spring for urging said piston rod inwardly, a piston threaded onto said piston rod, a sleeve communicating with said barrel, a cylinder reciprocably mounted in the outer end of said sleeve and communicating with said sleeve, a plunger carried by said barrel for discharging the contents of said cylinder, and a piston surrounding said cylinder and reciprocably mounted in said sleeve.

5. A lubricant compressor, comprising a barrel, spring means in said barrel for placing the lubricant therein under pressure, a sleeve communicating with said barrel, a cylinder reciprocably mounted in said sleeve and communicating therewith, a piston carried by said cylinder and subjected to the pressure of the lubricant in said sleeve, and a plunger for expelling the lubricant from said cylinder.

6. A lubricant compressor, comprising a barrel, a cylinder communicating with said barrel and reciprocable relatively thereto, a plunger for expelling the lubricant from said cylinder, and common means for placing the lubricant in said barrel under pressure and for moving said cylinder to its outermost position.

7. A lubricant compressor, comprising a barrel, a cylinder communicating therewith, a plunger for discharging the lubricant from said cylinder, and common means for discharging the lubricant from said barrel into said cylinder and for indicating to the operator when said compressor is in operative condition.

8. A lubricant compressor, comprising a barrel, a cylinder communicating therewith, a plunger for discharging the lubricant from said cylinder, and common means for forcing lubricant from said barrel into said cylinder and for holding said barrel and cylinder in such relative positions as to permit said cylinder to be recharged from said barrel.

9. A lubricant compressor, comprising a barrel, having a tubular extension at one end, a sleeve extending through said tubular extension and provided with an annular rib engaging the outer end of said tubular extension, a nut threaded upon the inner end of said sleeve and engaging the adjacent end of the barrel for clamping said sleeve to said barrel, and lubricant compressing mechanism housed in said sleeve.

10. A grease gun comprising a cylinder, a second cylinder communicating therewith and disposed in end to end relation at one end of the first cylinder, externally thereof, a tube having an annular piston formed therearound and disposed within the second cylinder, a plunger in said second cylinder movable into the tube as said tube is moved into the cylinder, and a spring for moving the tube out of said cylinder, said tubular member having radial openings located between said piston and said plunger and communicating with said second cylinder when the tube is in its outer position.

11. A grease gun comprising a cylinder, a second cylinder communicating therewith and disposed in end to end relation at one end of the first cylinder, externally thereof, a tube having an annular piston formed therearound and disposed within the second cylinder, substantially filling said cylinder, a plunger in said second cylinder movable into the tube as said tube and piston are moved into the cylinder, and a spring for moving the tube and piston out of said cylinder.

12. A grease gun comprising a cylinder, a second cylinder communicating therewith in end to end relation, a tube communicating with said second cylinder, means to draw a charge of grease from said first cylinder into said second cylinder, and means to draw a charge of grease from said second cylinder into said tube.

13. A grease gun comprising a cylinder, a second cylinder communicating therewith in end to end relation, a tube communicating with said second cylinder, means to draw a charge of grease from said first cylinder into said second cylinder, and means to draw a charge of grease from said second cylinder into said tube, and means to manually force a charge of grease from said first cylinder into said second cylinder.

In witness whereof, I hereunto subscribe my name this 29th day of April, 1924.

ERNEST W. DAVIS.